No. 793,646. PATENTED JULY 4, 1905.
A. FARKAS.
INCANDESCENT GAS LAMP.
APPLICATION FILED JUNE 3, 1904.

3 SHEETS—SHEET 1.

No. 793,646. PATENTED JULY 4, 1905.
A. FARKAS.
INCANDESCENT GAS LAMP.
APPLICATION FILED JUNE 3, 1904.

3 SHEETS—SHEET 3.

Witnesses:

Inventor:
Armand Farkas,
By Wm E Boulter
Attorney

No. 793,646. Patented July 4, 1905.

UNITED STATES PATENT OFFICE.

ARMAND FARKAS, OF PARIS, FRANCE.

INCANDESCENT GAS-LAMP.

SPECIFICATION forming part of Letters Patent No. 793,646, dated July 4, 1905.

Application filed June 3, 1904. Serial No. 211,016.

*To all whom it may concern:*

Be it known that I, ARMAND FARKAS, a citizen of the Republic of France, residing at Paris, France, have invented certain new and useful Improvements in Incandescent Gas-Lamps, of which the following is a specification.

This invention relates to an incandescent burner with inverted gas-flame, particularly useful for lamps for lighting railway-carriages or other vehicles, the invention comprising certain constructive modifications in the feeding device for the burner of the lamp, as well as the arrangement for the circulation of the air required for combustion, the suspension of the mantle, and a protector for the latter.

Figure 1:
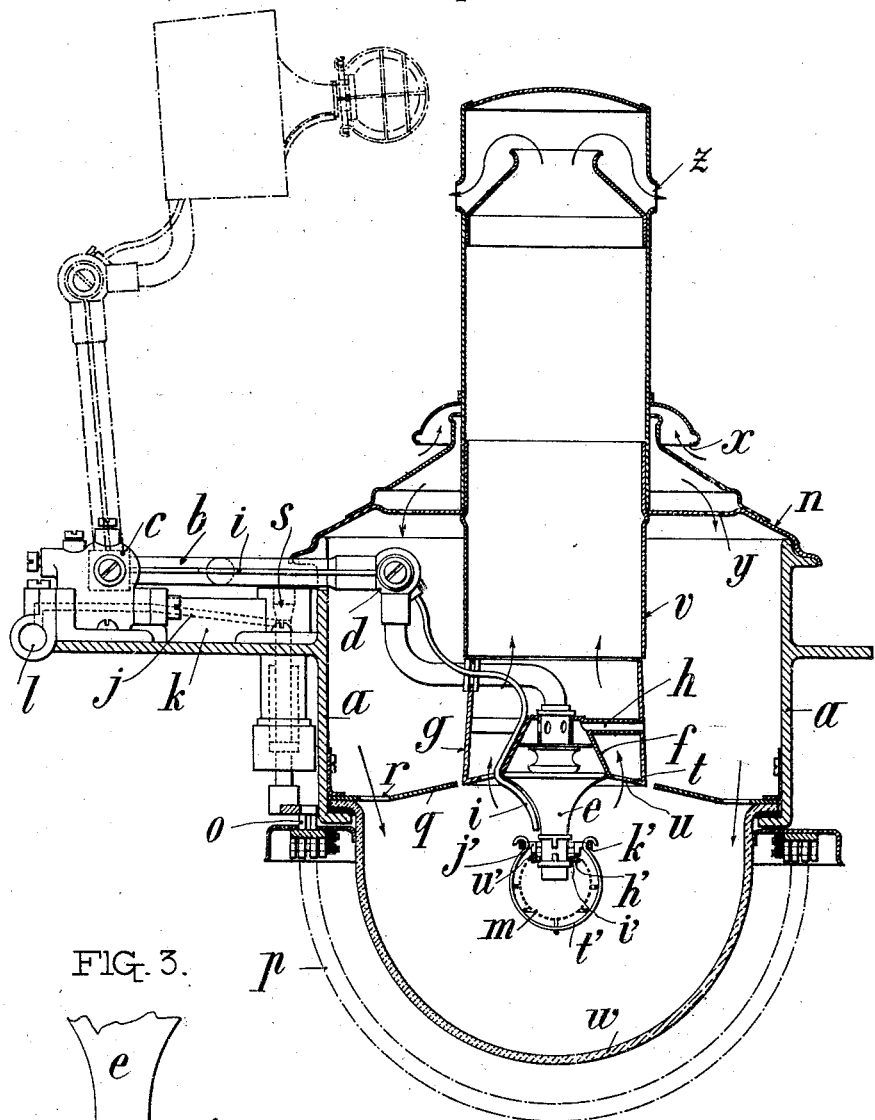
Figure 2:
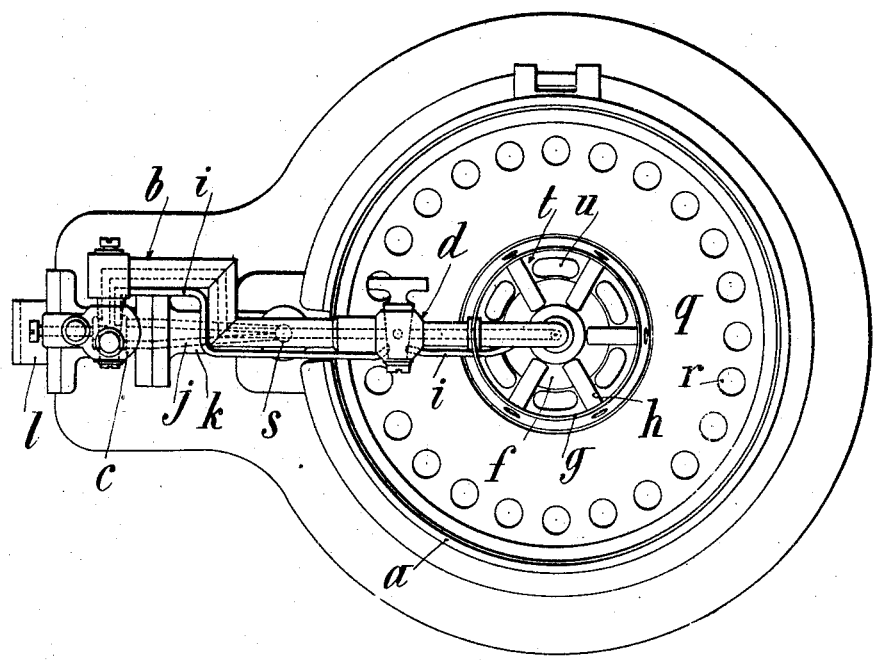
Figure 4:
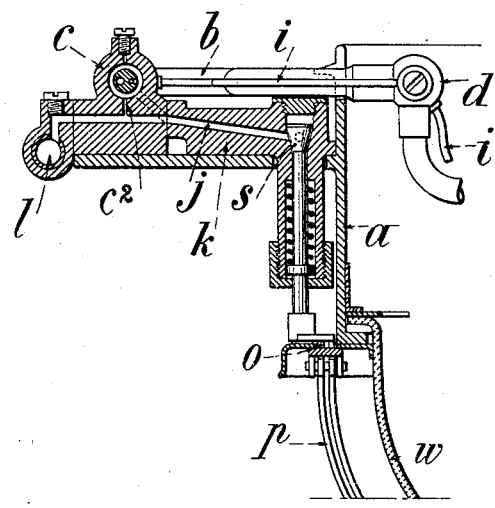
Figure 5:
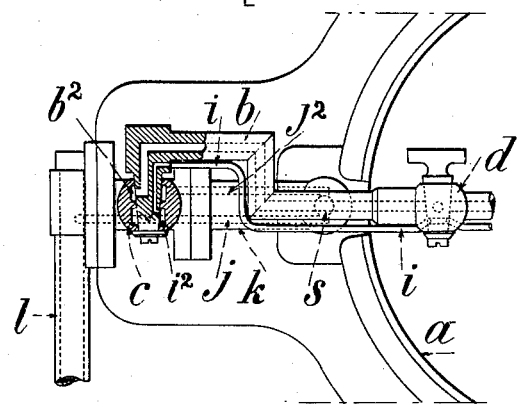

In the accompanying drawings, Figure 1 is a vertical section through the center of a lamp provided with an inverted-flame burner. Fig. 2 is a plan view of Fig. 1, the cap having been removed. Fig. 3 is a detail view. Figs. 4 and 5 show, respectively, a vertical section and a plan view, partly in section, of the gas-supply-controlling apparatus.

In the existing lamps for lighting railway-carriages or other passenger-vehicles the burner is generally mounted on a branch hinged to the supply-pipe, so that by raising the branch in question it is possible to disengage the interior of the lamp in order to clean it or to light the burner. Moreover, in these lamps the lowering of the light is effected automatically by the handling of the screens of the said lamps when they are pulled down in order to cover the globe.

The object of this invention is to utilize the same or similar arrangements with suitable modifications, while replacing the existing burner by a burner with an invert-flame incandescent mantle.

To that end the branch $b$, connected to the cone $e$ and provided with a tap $d$, is bent down in such manner as to clear the lower portion of the chimney $v$ and to terminate in the center of the lamp. At that point the branch $b$ receives the combined injector and Bunsen burner, possessing the characteristic feature of an inverted cone $e$, which protects the burner against ignition due to the hot combustion-gases. The protection of the Bunsen burner is, moreover, insured by the provision of an annular circulating-chimney for the hot gases, which surrounds the burner above the cone $e$ and is constituted by a conical jacket $f$, resting with its base on the said cone $e$ and coöperating with another jacket or casing, forming between them a space through which pass radial tubes $h$, admitting fresh air from outside the casing $g$ to the Bunsen-burner tube inside the jacket $f$.

When the burner is in place in the casing $a$ of the lamp, the base of the casing $g$ is near the edge of the central opening of a disk $q$, constituting the reflector of the lamp, which is held in place, but in such manner as to be easily removable, by a bayonet-joint or by a spring combined with a ring for securing the globe $w$. The disk $q$ is provided with a circular series of holes $r$ for supplying the air required for combustion in the lamp. A crown or plate $t$, uniting the lower edges of the casing $g$ and jacket $f$, forms an inner extension of the reflector-disk $q$. This crown $t$ is provided with holes $u$, allowing the combustion-gases to pass upwardly between the tubes $h$, admitting fresh air, and then to the chimney $v$.

The burner being in place and the cap $n$ of the lamp arranged on the casing $a$, the lower edge of the chimney $v$, carried thereby, comes near or surrounds the upper edge of the outside jacket or casing $g$, so that air arriving in the interior of the lamp through the gallery $x$ and passing through holes $y$ in the cap $n$ is forced to pass through the disk $q$ and to mix with the hot combustion-gases and afterward to escape into the atmosphere through the holes $z$ in the chimney. Owing to this arrangement natural ventilation is attained in the space comprised between the disk $q$ and the globe $w$ and a considerable reduction in the temperature of the gases passing between the casings $f$ and $g$. In order still further to reduce the effect of the high temperature of the burner due to the passage of hot gases, the burner can be connected to the branch $b$ by means of a branch made of some material which is a bad conductor of heat.

The lowering of the lighting intensity cannot be effected in the same manner with a burner with incandescent mantle as with ordinary burners without interfering with the good working of the mantle. It is therefore necessary to cut off completely the admission of gas to the burner, allowing, however, the gas to enter an auxiliary pipe of a by-pass burner which being arranged in proximity to the mantle always remains alight and forms a permanent by-pass for lighting the latter when gas is again admitted to the burner. This is effected by providing a small pipe $i$, which being connected to the casing of the hinge $c$ extends along the branch $b$ and terminates near the mantle $m$ after passing through the stop-cock $d$.

The cutting off of the admission of gas to the burner by the operation of the screens or curtains covering the globe $w$ is effected by means of a similar valve $s$ as is now used in existing lamps of the system illustrated, but with the difference that the valve completely cuts off the passage of gas through the corresponding passage $j$ instead of being regulated so as to cut it off merely partially. The passage $j$ is made in a block $k$ and connects the main feed-pipe $l$ to the casing of the joint $c$.

When the curtains are moved by means of the rods $p$, so as to cover the globe $w$, said rods or rings $p$, by means of small levers $o$ with which they are provided, allow the spindle of the valve $s$ to be acted upon by its spring to close the passage $j$. The mantle $m$, being no longer fed, becomes extinguished, and gas arrives only through the pipe $i$ of the small by-pass burner, which burns permanently. When, on the other hand, the curtains are drawn open, the levers $o$ raise the valve $s$, which admits gas through the passage $j$ to the mantle, which is then lighted again by the by-pass.

The joint $c$ is provided with two circular grooves $b^2$ and $i^2$, with which the branches $b$ and $i$, respectively, communicate. The groove $b^2$ is, moreover, connected by a passage $j^2$ to the valve $s$, whereas the groove $i^2$ is connected through a small passage $c^2$ to the passage $j$, which in its turn communicates directly with the feed-pipe $l$ and the valve $s$. From this arrangement it will be seen that when the rods $p$ for closing the curtains of the globe $w$ are operated the closing of the valve $s$ also takes place, thus cutting off the gas from the passages $j$ and $j^2$ to the burner; but this obturation does not affect the branch $i$ of the by-pass, which is in constant communication with the feed-pipe through the passage $c^2$.

The arrangement described with reference to lamps in which access to the burner is obtained only from the top—that is to say, by opening or removing the cap $n$—can be equally well applied to lamps the globes of which open by means of a hinge-joint, enabling access to be gained to the burner from below.

The distinctive feature of the mounting of the mantle consists in the fact that it is combined with ribs for preventing the support of the mantle from accidentally separating on account of any vibrations to which it may be exposed, more particularly in railway-carriages. Moreover the mantle-support itself comprises outside a crown, enabling it to be easily seized without any risk of damaging the mantle when putting it on or taking it off.

A little above the lower extremity of the conical tube $e$ for admitting combustible mixture are arranged outside the tube collars $b'$ $c'$, arranged at a distance from each other. The upper collar $b'$ is completely closed or of ring form, while the lower collar $c'$ is provided with three openings or slots $g'$, enabling corresponding projections $i''$ of the support to pass easily. Between the two collars $b'$ $c'$ are arranged partitions or ties $d'$ $e'$, situated along the generatrices of the tube $e$ and vertically dividing the space comprised between the said collars into two nearly equal parts. One of the partitions, $d'$, is full, but the other, $e'$, is provided about the middle of its height with a slot $f'$ to enable one of the projections $i''$ of the mantle-support to pass. The mantle-support is constituted by two superposed crowns or rings, the bottom ring $h'$ being provided with an outside groove to enable the mantle $m$ to be fixed to it, the upper ring $k'$ enabling the support to be easily taken hold of without risk of damaging the mantle. This ring $k'$ is connected to the ring $h'$ by bent arms $j''$, with which coincide the projections $i''$.

In accordance with the above arrangements the attachment of the mantle $m$ to the tube $e$ is effected by taking hold of the upper ring $k'$ and introducing it over the lower end of the tube $e$, causing the projections $i''$ to coincide with the openings $g'$, then after having brought the said projections to the level of the opening $f'$ turning the support so that the projection which appears opposite that opening should be able to pass to the other side of the partition $e'$. During the latter part of the operation one of the other projections, $i''$, strikes the full partition $d'$, thus stopping the support in the rotary movement that is imparted to it as soon as the projection $i''$ has passed to the other side of the partition $e'$. The support being thus released it comes to rest with its projections $i''$ on the full parts of the lower collar $c'$. In that position the support cannot turn round the tube $e$ either in one direction or the other, its projections being stopped, on the one hand, by the lower part of the partition $e'$ and, on the other hand, by the partition $d'$. In order to separate the mantle-holder from the tube $e$, the operation is effected in the reverse manner—that is to say, the mantle-holder is raised, so as to bring the projection adjoining the partition $e'$ opposite the opening $f'$, then it is turned until one of the other projections strikes the full partition $d'$, then it is lowered, the projections passing through the openings $g'$. The latter part of the operation takes place without any risk of failure or uncertainty owing to the sliding of one of the projections $i''$ against the full partition $d''$, which forms a guide for it. It follows from the above that any vibrations to which the mantle-holder might be exposed would be unable to impart to it combined movements capable of raising it and causing it to turn about its own axis whatever be the force and the frequency of the shocks in question.

The protective device for the mantle consists of a basket intended to protect the incandescent mantle against any shocks to which it may be exposed and acting at the same time as a receptacle for fragments which may fall off from the mantle when the latter is broken for any reason, enabling also the said fragments to be maintained under the action of the blue flame, thus keeping them incandescent. The basket can be equally well applied to mantles of burners with an upward flame as with an inverted flame.

The protective basket is constituted by a wire or other netting $t'$, preferably having the same shape as the mantle $m'$ to be protected. Its dimensions are slightly larger than those of the mantle, so that after having been put in place and secured by any suitable means there is a small space between the mantle $m$, which it protects, and the netting.

The arrangement of the wires constituting the basket and the size of meshes formed by them can naturally be varied, as desired. In order to prevent the wires from casting shadows, they can be covered with asbestos, and the whole of the basket after having been completed can be dipped into a lighting solution of the same kind as that used for rendering the mantle incandescent. The securing in place of the basket can be insured by connecting its wires $t'$, situated at its opening, to the same circle $u'$ as that to which in certain cases the mantle is secured or else by connecting those wires to an auxiliary circle connected to the tube of the burner.

It will be understood that in accordance with the above arrangements if for any reasons a foreign body were to get near the mantle the latter would be protected by the basket against any injury. In the same way if owing to an extraordinary shock to the whole of the burner the mantle became broken the fragments retained by the wires of the basket would remain exposed to the heat of the blue flame of the burner, so that being still maintained in the state of incandescence they would preserve at all events some of their lighting power.

What I claim as my invention, and desire to secure by Letters Patent, is—

1. An inverted incandescent gas-burner comprising a downwardly-directed Bunsen tube, a downwardly-directed cone around said Bunsen tube and a slotted double collar applied to said cone for supporting the mantle-holder, substantially as set forth.

2. An inverted incandescent gas-burner comprising a downwardly-directed Bunsen tube, a downwardly-directed cone around said Bunsen tube and a slotted double collar applied to said cone for supporting the mantle-holder, in combination with a double ring-holder for a mantle and mantle-protector, substantially as set forth.

3. In an inverted-mantle incandescent gas-burner, a downwardly-directed Bunsen tube, a downwardly-directed heated-air deflector-cone $e$, a perforated jacket closely surrounding the base of the inverted cone and the upper part of the Bunsen tube, air-supply passages extending from outside the jacket to the Bunsen tube, and a reflector-ring forming a continuation of the base of the jacket, substantially as set forth.

4. In an inverted-mantle incandescent gas-burner a downwardly-directed Bunsen tube, a downwardly-directed heated-air deflector-cone $e$, an upper collar mounted on the lower end of said cone and a lower slotted collar also mounted on the lower end of said cone and a full bar and a slotted bar intermediate the two collars in combination with a mantle-support adapted to engage between the said collars, substantially as set forth.

In testimony whereof I have signed my name to this specification in the presence of two subscribing witnesses.

ARMAND FARKAS.

Witnesses:
   LOUIS SULLIGER,
   HANSON C. COXE.